United States Patent [19]

Larsen

[11] Patent Number: 5,800,701
[45] Date of Patent: Sep. 1, 1998

[54] APPARATUS, COMPONENTS AND A METHOD FOR THE FILTERING OF LIQUID

[75] Inventor: Ole Jens Larsen, Dragoer, Denmark

[73] Assignee: I. Kruger Systems A/S, Soeborg, Denmark

[21] Appl. No.: 737,858

[22] PCT Filed: May 24, 1995

[86] PCT No.: PCT/DK95/00207

§ 371 Date: Nov. 21, 1996

§ 102(e) Date: Nov. 21, 1996

[87] PCT Pub. No.: WO95/32044

PCT Pub. Date: Nov. 30, 1995

[30] Foreign Application Priority Data

May 25, 1994 [DK] Denmark ................... 0586/94

[51] Int. Cl.[6] .................. B01D 33/056; B01D 33/333; E02B 5/08
[52] U.S. Cl. ................ 210/158; 210/160; 210/159; 210/400; 210/791; 210/783; 210/107
[58] Field of Search .................. 210/158, 159, 210/160, 400, 401, 783, 741, 791, 107, 108

[56] References Cited

U.S. PATENT DOCUMENTS

| | | |
|---|---|---|
| 1,190,920 | 7/1916 | Leoni . |
| 1,190,921 | 7/1916 | Leoni . |
| 3,608,727 | 9/1971 | Grutsch . |
| 4,188,294 | 2/1980 | Higihara ................... 210/160 |
| 4,892,652 | 1/1990 | Rudy . |

FOREIGN PATENT DOCUMENTS

| | | |
|---|---|---|
| 0291574 | 2/1992 | European Pat. Off. . |
| 0577942 | 1/1994 | European Pat. Off. . |
| 91/17807 | 11/1991 | WIPO . |

*Primary Examiner*—Thomas M. Lithgow
*Attorney, Agent, or Firm*—Thomas R. Vigil

[57] ABSTRACT

An endless filter chain for filtering a liquid, such as sewage, which flows along a drainage duct is provided. The filter chain comprises strainer elements and connecting links interconnected to allow the strainer elements to pivot about respective axes of the connecting links while maintaining a small clearance between the leading edge of each strainer element and the trailing edge of the respective adjacent preceding element while the filter chain is trained about an upper and a lower turning roller, the filter chain does not comprise conveyor chains and the strainer elements can be sized to a width where they cover practically the entire width of the drainage duct. A method and an apparatus for filtering liquid as well as a strainer element and a connecting link are provided.

22 Claims, 8 Drawing Sheets

APPARATUS, COMPONENTS AND A METHOD FOR THE FILTERING OF LIQUID

BACKGROUND OF THE INVENTION

1. Field of the Invention.

The present invention relates to an endless filter chain for removing solids from a liquid.

2. Description of the Prior Art.

Filtering liquid in order to separate solid material from a liquid is a well known basic operation which is used in many different fields of application. The core component of a filter may be described as a mechanical fixed component provided with openings which allow liquid to pass through while solid objects will be withheld if they are too large to pass the openings. Basic specification parameters for a filter comprise the mesh size which substantially determines which particle sizes are withheld or, alternatively, allowed through, as well as the pressure differential required to force the liquid through the filter. Depending on the operating conditions, such as the characteristics of the materials to be filtered out and the desired capacity, requirements to maintenance, longevity, etc., a wide variety of different specific technical filter embodiments are available.

For the purification of sewage water it is common to use a filter at an early stage of the purification process, i.e. before the sedimentation and digesting tanks. Experience has shown that sewage water conveys solid components which hamper or hinder the processes desired to take place in order to realise the purification of the sewage water and therefore, it is advantageous to remove them at an early stage. Due to the large quantities of water in question, it is desired that the filtration be carried out with a very low pressure loss, as in practice every pressure difference across the filter represents a loss of energy. Conveniently flow filters are used which are dimensioned to allow suitably large quantities of water to pass at a low pressure differential.

It is usually desired that the solid materials withheld in the filter be drained of water and removed with a minimum of manual interference. This may conveniently be realised with a filter apparatus featuring an endless chain which carries strainer elements along a path comprising a section where they are conveyed below the liquid surface level where liquid is forced therethrough and another section extending above the liquid surface level where the withheld material, usually designated the filter cake, is further drained and may be removed from the individual strainer elements.

EP-B-0,291,574 discloses a filter apparatus of this type where a number of strainer elements are suspended between two carrier chains which are trained about an upper and a lower end roller in a path which extends substantially rectilinearly between the turning rollers. The ascending strainer elements move in a direction slantingly backwards relative to the flow direction of the water and the apparatus comprises at a point located shortly after the elements have been driven around the upper turning roller, rotatable cleaning brushes which may be operated to brush the filter cake off the strainer elements and from where it may drop into a receptacle. The individual strainer elements have rectangular profiles and comprise perforated plates or grates which are arched or angled outwards in order to increase the free flow area of the filter and to strengthen the strainer elements. To seal the sides of the filter chain, the individual strainer elements are provided with laterally delimiting staggered sliding planes which constitute a safeguard against lateral displacement and serve as a protective screen. The sliding planes slide along a row of stationary brushes at each side contacting the outer faces of the sliding planes and serving the purpose of preventing water from bypassing the filter.

With the known filter apparatus the lateral sealing is a critical point. The laterally delimiting planes of the strainer elements which are fastened to the chains slide onto each other when the chain moves and are thus exposed to wear and may give rise to interruptions of service in case hard objects enter between the planes, e.g. when the chain is driven around the lower turning roller, where there may be a risk of solid objects being jammed in. The brushes must contact the edges of the strainer elements in order to prevent water from bypassing, however, the edges do not have identical spacings to the brushes as they are necessarily not successively disposed in exactly the same track as they need to be slideable onto each other. Therefore the brushes will be exposed to wear. The brushes being permanently mounted below the liquid surface level, the inspection and replacement thereof are fairly complex. Moreover it adds to the cost of manufacturing that the strainer elements must be produced in at least two variants in order for them to be combined in the intended manner.

Moreover, it is hardly conceivable that the carrier chains and the lower turning roller can be kept clear of the sewage water. This environment may the the cause of interrupted operation as it will be difficult to provide bearings and bearing materials which ensure satisfactory performance and longevity in the aggressive environment constituted by the sewage water and at reasonable costs. Since the proofness of the lateral sealings depends on the rigidity of the brushes, there is also a risk that the sealing is not always satisfactory; for instance, the brushes might yield to the water pressure, implying that the quality of the sealing could depend on the pressure difference prevailing at any time across the filter.

The carrier chains are arranged on both sides of the strainer elements out of or slightly out of reach of the brushes, and therefore the chains occupy an area which cannot be effectively utilized for the filtering. The filtering area is very crucial to the pressure difference and it is desirable that the non-used area at the sides be reduced as much as possible since, preferably, this type of filters should be immersible into rectilinear ducts within the existing cross section as it would represent a substantial additional cost if it should be necessary to rebuild the duct to widen its cross section to provide room for an increased filter area.

Moreover, the laterally delimiting planes and the carrier chains constitute components which are cleaned only with difficulty due to their complex shape.

SUMMARY OF THE INVENTION

The invention provides an endless filter chain for the filtering of liquid with the object of removing solid objects from the liquid and comprising strainer elements and connecting links interconnected to form a chain adapted for being trained around turning rollers, wherein each strainer element extends in the conveyor direction of the chain and is delimited by two mutually parallel edges designated leading edge and trailing edge, respectively, and by two lateral edges extending perpendicularly to the leading edge and the trailing edge, wherein two successively arranged strainer elements are connected over one or more connecting links so as to allow the strainer elements to pivot relative to the connecting link or the connecting links about a pivot axis parallel with the leading edge and the trailing edge, each connecting link comprising pivot means defining two parallel, spaced pivot axes, whereby said connecting link may link together two successively arranged strainer elements with freedom for each strainer element to pivot relative to the connecting link about a respective one of said pivot axes, while the leading edge and the trailing edge on each strainer element are so designed that a small clearance is maintained between the leading edge of a strainer element and the adjacent trailing edge on the immediately preceding strainer element, and so that this clearance is maintained with approximately unchanged width whether the filter chain is trained about turning rollers or runs straight.

This filter chain is composed of strainer elements and connecting links and thus it does not comprise separate carrier chains. All strainer elements and all connecting links, respectively, may be completely identical which is a significant practical advantage thereof. The strainer elements may be sized to such width that they occupy the entire duct width almost completely and it becomes easier to implement suitable sealing between the side walls of the duct and the strainer elements to ensure that non-filtered water is not allowed to pass beyond the sides of the filter chain. The clearance or the gap between the leading edge on one strainer element and the adjacent trailing edge on the immediately preceding strainer element is kept so small that objects which are larger than acceptable with a view to the desired filter performance are not allowed to pass therethrough. It is a substantial advantage that this clearance or gap is approximately constant when the filter chain is trained about turning rollers as it ensures that no problems arise due to materials getting jammed in the gaps.

The gap width may be maintained practically uniform and constant during the cycling of the filter chain if the leading edge and the trailing edge on each strainer element are shaped in the form of a section of a cylinder surface with cylinder axes which are coincident with the pivoting axes of the strainer elements disposed at the respective leading and trailing edges. Herein, the gap width will be equal to the distance between the two pivoting axes in the connecting link minus the radii of the two cylinder surfaces. The cylinder radii in the leading edge and the trailing edge may be identical or they may be different, the essential being that together and in combination with the connecting link they produce the prescribed gap. The leading edges and the trailing edges will be shaped to follow respective cylinder surfaces across angle sectors which correspond to the respective regions on the neighbouring strainer elements which may happen to be most proximate to eachother depending on the mutual angle rotation to which the links are subjected during operation of the filter chain.

By providing the leading and the trailing edges on the strainer elements by means of respective cylindrical tubes, a convenient solution from a structural point of view is presented as the bearings for the connecting links are conveniently arranged concentrically to the respective tubes. Preferably, the tubes should have a smooth surface to allow solid material to glance off. The design of the strainer elements with leading and trailing edges comprising cylindrical tubes has the further advantage that it provides suitable transverse stiffening of the strainer elements where it is important that deflection is avoided because it could mean that the gap width is not maintained constant.

The bearings in the strainer elements for the connecting links may conveniently be realised by the insertion of bearing bushings from the tube extremities, said bearing bushings being, of course, made of a material suitable as a bearing material in the environment where the filter chain is to be used, and in particular in an aqueous environment. The bearing material may e.g. be nylon or any other material known in the art. The connecting links may conveniently be provided with two uniform, parallel and adjacently located trunnions arranged to be introduced axially into the respective tubes from the tube extremities so that two strainer elements are connected by the introduction of one connecting link from either side of the strainer elements. This provides a simple construction and a easy assembly.

Conveniently, the cylindrical tubes are terminated a certain distance within the lateral edges of the strainer elements and the connecting links are conveniently arranged in such a manner that in essence they do not or do only to a small extent protrude outwards to the sides relative to the lateral edges of the strainer elements. By such embedding of the connecting links almost completely within the width of the strainer elements, optimum utilization of the area available for the filter chain is obtained and the edges of the filter chain become continuous and smooth whereby it becomes easier to realize effective sealing at the lateral edges of the filter chain. The chain according to the invention is furthermore remarkable in that it is easy to clean mechanically, its entire outer surface being within reach of a single rotating brush.

According to an advantageous embodiment the connecting links and the lateral edges are designed and matched in such a manner that the filter chain may run between permanent elongated lateral planes with clearances which are so small that the filter performance is maintained without use of any particular sealing means along the lateral edges, i.e. without any openings or gaps occurring between the lateral planes and the lateral edges which exceed what is acceptable with a view to the desired filter performance. Hereby it is no longer necessary to provide brushes or other sealing means which would be exposed to wear and would constitute a factor of uncertainty through varying degrees of sealing depending on wear, pressure difference and the like.

Conveniently, the lateral edges of the strainer elements and/or at the connecting links are provided with protruding elements of a low-friction material which is suitable for sliding against permanent lateral edges so that the filter chain is guided with a limited lateral clearance. This results in a well defined guiding of the filter chain, and wear of filter chain components, other that those intended to sustain it, is avoided. The elements of low-friction material are conveniently mounted in a replaceable manner on the connecting links. This allows for advantageous construction from an operation and maintenance point of view and good control of the chain is obtained where the individual strainer elements have guiding points at their corners.

The connecting links may be maintained in engagement with the strainer elements solely by the chain being guided between fixed lateral planes which do no allow the connecting links to escape sideways. Hereby it is rendered redundant to fit particular locking means. This is a substantial advantage because experience has shown that locking means constitute a very critical detail in installations of this type, e.g. because in many instances the locking elements must be made of resilient materials which are less resistant to corrosion and because the locking elements may fail and cause operation breakdowns.

To enable them to exercise the filtering function proper the individual strainer elements may comprise grates or perforated plates which fill a substantially coherent area which extends from the leading edge to the trailing edge on the strainer elements and which extends transversely between respective lateral edges which run substantially perpendicular to the leading edge and the trailing edge. The grate or the perforated plate may be planar or it may have other shapes, e.g. such that, seen in section perpendicularly to the tubes, it extends arched, angularly or polygonally, and it may optionally comprise conveyor protrusions whose purpose it is to carry the filter cake to prevent it from trailing downwards along the filter chain when the chain is carried upwards, e.g. along a slantingly ascending line. Thereby, improved ability to lift the solid material out of the water is imparted to the filter chain, since there is less danger that solid material rolls or slides downwards. Non-planar designs further serve to ensure that the effective area of the filter is increased.

Moreover, the invention provides a strainer element and a connecting link, respectively, for use in a filter chain. These components allow realisation of filter chains which exhibit the advantages described above.

The invention provides an apparatus for filtering liquid which flows along a duct comprising an endless filter chain as described above; guide means which guide the filter chain in a closed path which extends partially above and partially below the surface level of said liquid; driving means to move the filter chain along said path and lateral control means in the form of fixed lateral planes in the duct which form a substantially unbroken slide plane in each side to support the driving chain laterally with a narrow clearance. This apparatus utilizes the space available in the liquid flow duct very effectively and provides good filter performance at a low pressure drop and it is very effective for removing solid material from the liquid.

Conveniently the apparatus comprises a motor-operated roll arranged above the surface level of liquid and fixed elements of a low-friction material to guide the chain along a path extending from the drive roll through a substantially rectilinear descending flight through a lower turning zone below the surface level of liquid and through a substantially rectilinear ascending flight back to close around the drive operating roll. Hereby an apparatus is obtained which is very reliable and operationally dependable and easy to service because the elements which are subjected to most wear and which are difficult to access operate with only very simple and robust components.

In the region below the chain at the lower turning zone, sealing means should be arranged to prevent or stop water from flowing below the chain so that the water to be filtered is substantially forced through the strainer elements in the filter chain. The sealing means below the bottom may comprise e.g. a substantially cylindrical centered in the axis of the lower turning roller and surface shaped in such a manner that it is swept by the strainer elements with a suitably narrow clearance when they pass through the lower turning zone. The cylindrical surface should extend over an angle which corresponds at least to the repetition length or the pitch of the chain in order to ensure that there is always at least one strainer element present to fill the gap and maintain the narrow clearance to the cylindrical surface in order to prevent or stop the water flow below the chain.

Although the sealing between chain and duct may be obtained according to the invention exclusively by keeping narrow clearances at both sides and downwardly, it is not outside the scope of the invention that in combination with the filter chain or the apparatus according to the invention, particular sealing means may be arranged at the lateral edges of the filter chain and below the chain in the lower turning zone. Such sealing means may comprise e.g. brushes or other means known in the art.

In the area between the ascending and the descending filter chain flights discharge apertures are conveniently provided in the lateral planes of the duct which allow liquid to flow out of this zone and into the duct at the downstream side relative to the filter. This is convenient in order to avoid that water is pressed through the filter chain on its descending flight which could lead to accumulation of filter cakes on the inside of the chain.

At a suitable point on the filter chain above the liquid surface level, means are conveniently provided to remove filter cakes from the filter chain and to collect the filter cakes for removal.

According to a particular embodiment the apparatus is made with openable panels in the fixed lateral planes which are so designed that connecting links and strainer elements may be dismantled through the side following opening of such panels. The panels which may be seen as openings provided with inspection covers or clean-out doors are integral with the fixed lateral planes, i.e. the doors are so constructed and designed that their insides are flush with the remaining portion of the fixed lateral planes when the doors are closed. In case the connecting links and/or strainer elements need dismantling, the inspection covers are removed and connecting links and possibly strainer elements may be withdrawn through the openings. The inspection covers are conveniently arranged in pairs opposite eachother thereby allowing convenient access to the filter chain.

The invention provides a method of filtering liquid wherein an apparatus as explained above is used wherein unfiltered water is fed to the filter chain at the front side of its ascending flight, wherein the filtrate is removed from the opposite side of said flight, and wherein the filter chain is trained to transport filtered-out material out of the water and to deliver it to a receptacle. It provides advantages which correspond to the above-described ones.

The filter chain may be trained continuously or it may be be trained intermittently under manual or automatic control. According to a particularly advantageous embodiment the pressure difference across the filter is monitored continuously and the filter chain is stopped for as long as the pressure difference is below a certain level but trained when the pressure difference exceeds the predetermined level. In that case the filter chain may run for a predetermined period of time corresponding to a predetermined stretch or it may be trained until the pressure difference has been reduced to a predetermined level. In this manner economical operation may be obtained since the amount of energy consumed to run the chain and the wear on the movable components may be minimized when the chain runs at any time only as much as needed. Since experience has shown that amounts and compositions of waste water vary very much, considerable economy of operation is obtained by allowing the chain to be trained only when needed.

Further objects and advantages of the invention will appear from the following detailed description of a specific, exemplary embodiment which is given with reference to the drawings.

BRIEF DESCRIPTION OF THE DRAWING

All figures are schematical and not necessarily to scale and are simplified so as to depict only details which are necessary to understand the invention while other details have been omitted. In all figures, identical reference numerals are used to designate identical or corresponding components.

DESCRIPTION OF THE PREFERRED EMBODIMENTS

Figure 1:
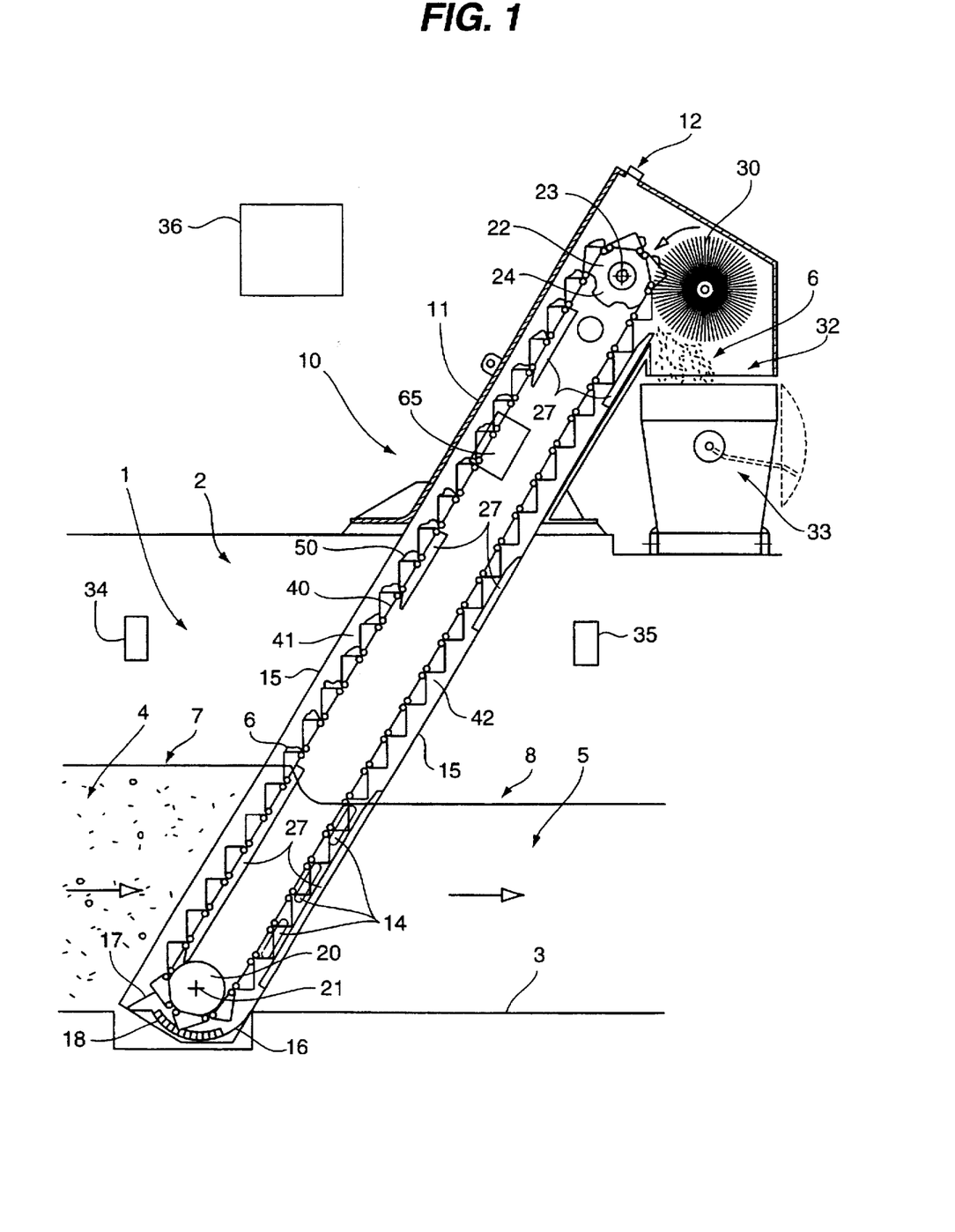
FIG. 1 is a vertical longitudinal sectional view of an apparatus according to the invention in the sectional plane B—B as indicated in FIG. 4.

Reference is first made to FIG. 1 which is a sectional view of a filter unit 10 disposed to operate in a drainage duct 1. The drainage duct 1 is delimited laterally by vertical parallel walls and downwardly by a substantially horizontal bottom 3. Upwardly it is open (cf. also FIG. 4). In the duct, unfiltered water 4, such as sewage water, is introduced from the left as indicated by the arrow in FIG. 1 and allowed to flow towards the filter unit 10. The filter unit 10 serves to withhold large solid objects which together form what is known as the filter cake 6, and to discharge water possibly containing fine solid objects to the right as indicated in FIG. 1, said mixture being known as the filtrate 5. The filter has a stalling effect on the water flow and thus generates a pressure loss as may be seen in FIG. 1 by comparison of the level of unfiltered water 7 to the filtrate level 8. In connection with the filter unit an upstream level sensor 34 is arranged to sense the surface level of unfiltered water and a downstream level sensor 35 to sense the surface level of filtrate, both level sensors being connected in a manner known in the art to permit them to transmit their signals to a control box 36.

Essentially, the filter unit 10 comprises a fixed filter housing 11 wherein an endless chain 40 is arranged which carries strainer elements 50, said chain travelling around a lower turning roller 20 with the center line 21 and arranged close to the duct bottom and around an upper turning roller 22 with the center line 23 arranged at the top of the filter unit. Between the two turning rollers, the filter chain extends substantially rectilinearly in an ascending flight 41 to the left in FIG. 1 and a descending flight 42 to the right in FIG. 1. The rectilinear flights are supported by slide bars 27 which serve to support the chain to prevent it from deviating from its intended path under the influence of the intrinsic weight of the connecting links or the dynamic water pressure.

In the preferred embodiment shown in FIG. 1, the slide bars 27 are arranged to support the chain throughout the stretch which usually runs below the liquid level and where the pressure load is most powerful. The slide bars are made of a material which has good low-friction properties in the relevant environment, e.g. nylon. When the filter chain is trained, the filter chain with the filter cake is carried upwards with the ascending flight 41 and around the upper turning roller 22 towards a rotating cleaning brush 30 that brushes off the front side of the filter chain whereby the filter cakes are caused to fall through the overflow 32 of the filter housing 11 and into a suitable receptacle 33.

The filter housing 11 is substantially closed on the portion above the duct, and at the top the filter housing is provided with a vent connecting piece 12 to allow controlled ventilation of the filter housing.

At the bottom the filter unit comprises a bottom plate 16 sealingly mounted relative to the duct bottom 3 and provided with upwardly oriented bottom brushes 18 that brush the elements of the filter chain and serve to stall and filter any flow of liquid which may pass below the filter chain in the region by the lowermost turning roller. To the left of the bottom brush 18 an upwardly slanting repeller brush 17 is shown which serves to retain stones, sand or the like.

Figures 2, 3:
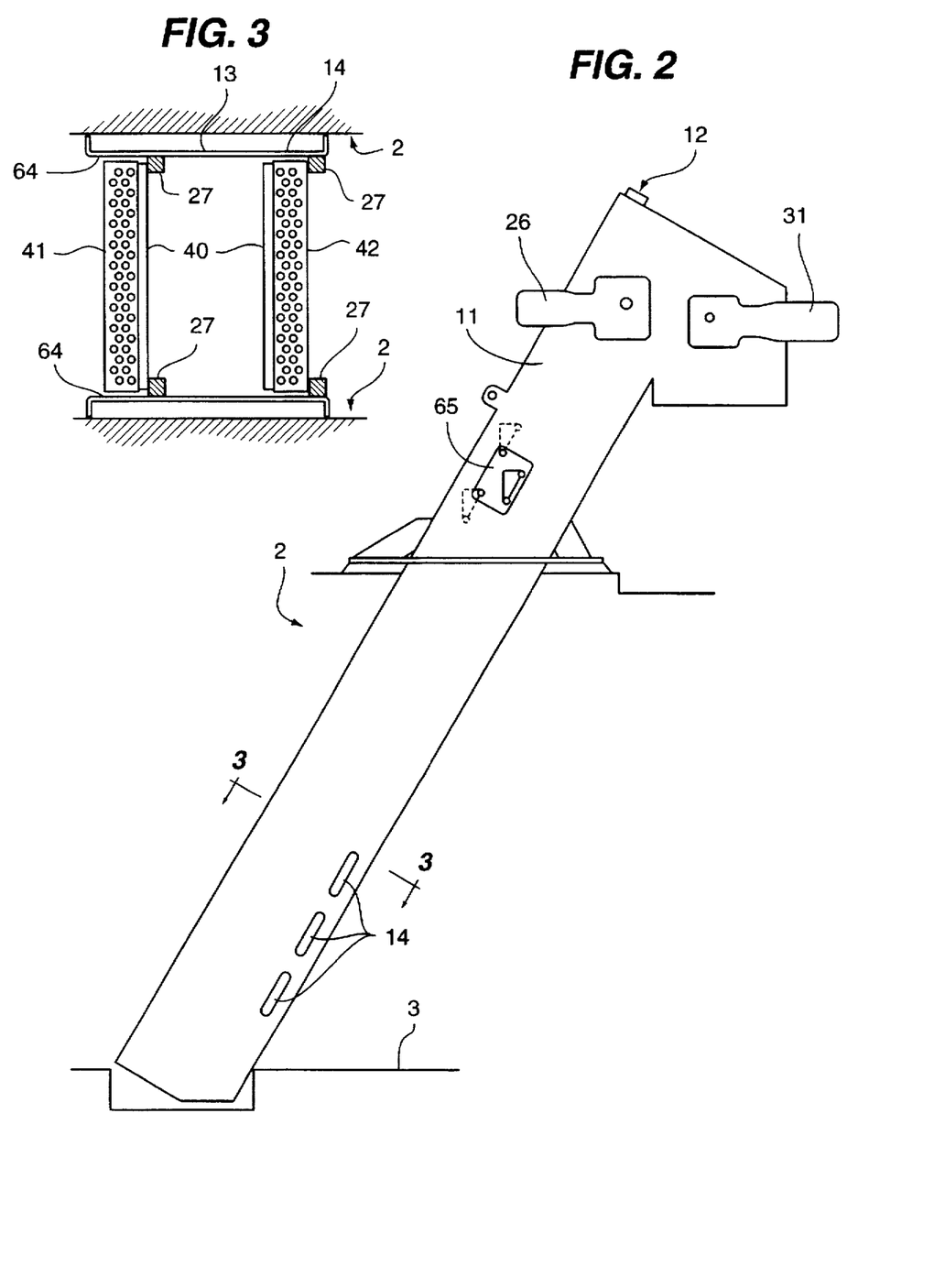
FIG. 2 is a vertical longitudinal sectional view of the apparatus seen in FIG. 1 in the sectional plane A—A as indicated in FIG. 4.
FIG. 3 is a sectional view along the line C—C shown in FIG. 2.
Figure 4:
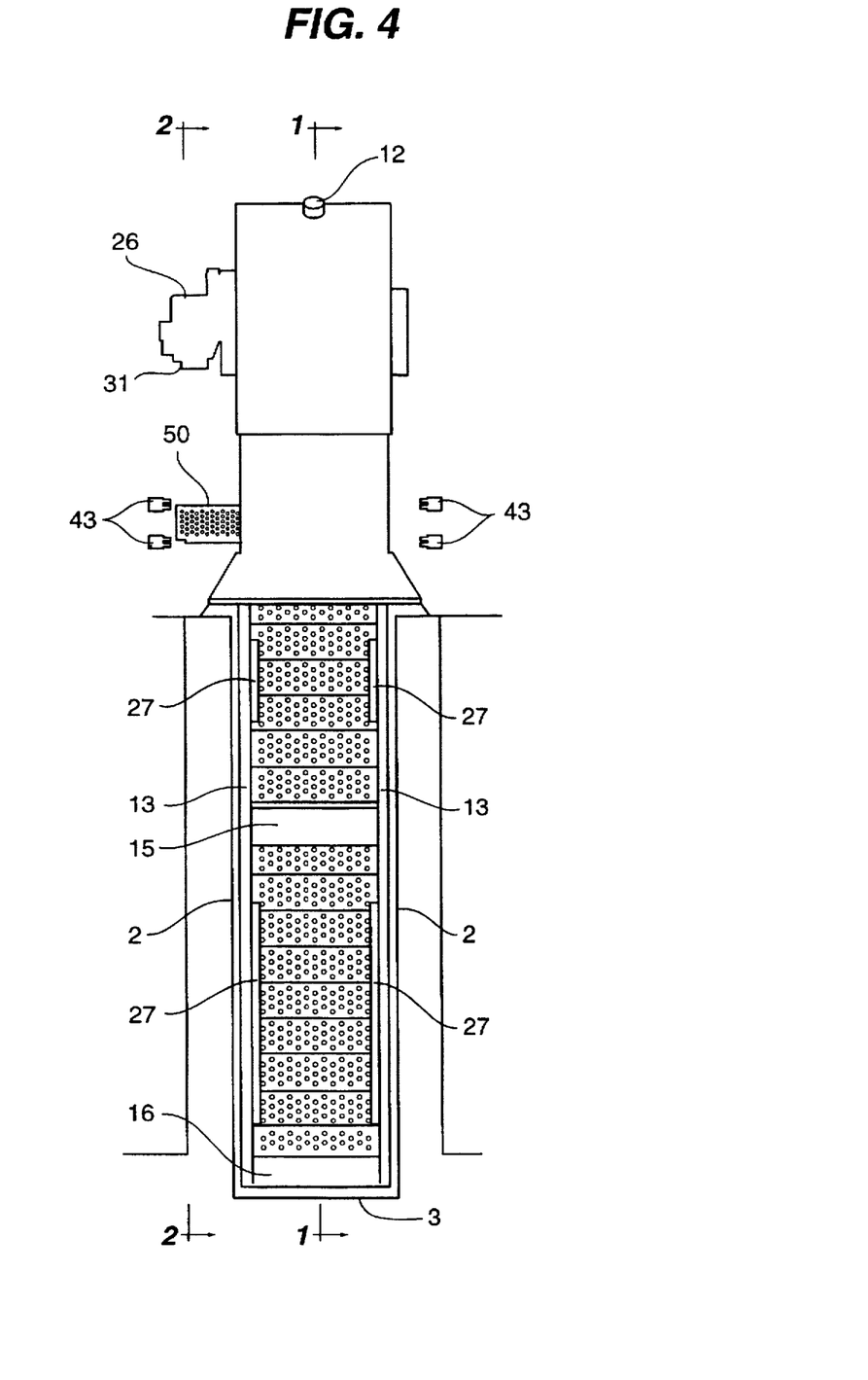
FIG. 4 is a sectional view of the apparatus along a vertical plane transverse to the duct and seen from the downstream side.

FIG. 2 shows the filter unit 10 in a sectional view along the line A—A indicated in FIG. 4, i.e. the filter unit is seen from the outside, and the most proximate side wall of the duct is omitted from the figure. In particular, FIG. 2 shows a driving motor 26 for the filter chain arranged adjacent the uppermost turning roller and a brushing motor 31 arranged opposite the cleaning brush (cf. also FIG. 1). Both motors are controlled from the control box 36 (cf. FIG. 1) and provided with suitable reduction gear to rotate the uppermost turning roll and the cleaning brush at suitable speeds of revolution. The driving motor 26 is further displaceably mounted relative to the filter housing to allow the filter chain to be suitably tightened by displacement of the motor.

At the bottom of FIG. 2, three elongated discharge apertures 14 in the sides of the filter housing are shown, said apertures serving to discharge a partial flow of water to the downstream side of the duct to allow any particles which may have entered between the ascending and descending flights of the filter chain to bypass the descending flight of the chain and so that the water pressure across the filter chain is reduced on its descending flight 42. In the embodiment shown the elongated apertures are arranged within a band extending along the upper side (i.e. the side to the right in the figure) of the strainer elements on the descending flight. The upper sides of the strainer elements being constructed non-planar as will be explained below, the band of elongated apertures allows communication with the spaces on both sides of the chain on the descending flight to permit the water to flow into and out of the space outside the filter housing sides. Moreover, FIG. 2 shows an inspection opening 65 above the level of the side wall 2 of the duct of such size that individual strainer elements 50 may be carried out of the filter housing therethrough as outlined in the figure.

FIG. 3 is a sectional view along the line C—C in FIG. 2 which clearly shows how in this plane the filter housing 11 substantially consists of two side profiles 13 formed of respective U-shaped sheets and mounted closely to the respective side walls 2. On the side profiles 13 slide bars 27 are mounted in such a manner that they support the filter chain 40 as outlined in the figure. Moreover it will appear how the discharge apertures 14 are arranged adjacent the descending flight of the filter chain.

Reference is now made to FIG. 4 which is a vertical sectional view of the filter unit as seen from the downstream side of the duct. FIG. 4 shows more clearly how the drainage duct 1 comprises walls 2 and a bottom 3 into which the filter unit is embedded in such a manner that the side profiles abut closely on the duct walls 2. At the top of FIG. 4 the profile of the brushing motor 31 and the driving motor 26 are sketched and so is the profile of the vent connecting piece 12. Somewhat further down it is hinted how a strainer element 50 may be conveyed through the side of the housing through the above-mentioned inspection opening 65. Moreover, four connecting links 43 are outlined in FIG. 4 which are pulled sideways before the strainer element 50 is removed from the filter chain. In the region between the walls of the duct, the side profiles 13 of the filter housing are shown which are mutually connected by transverse struts 15 and with the bottom plate 16 so as to form a stable structure.

Figure 5:
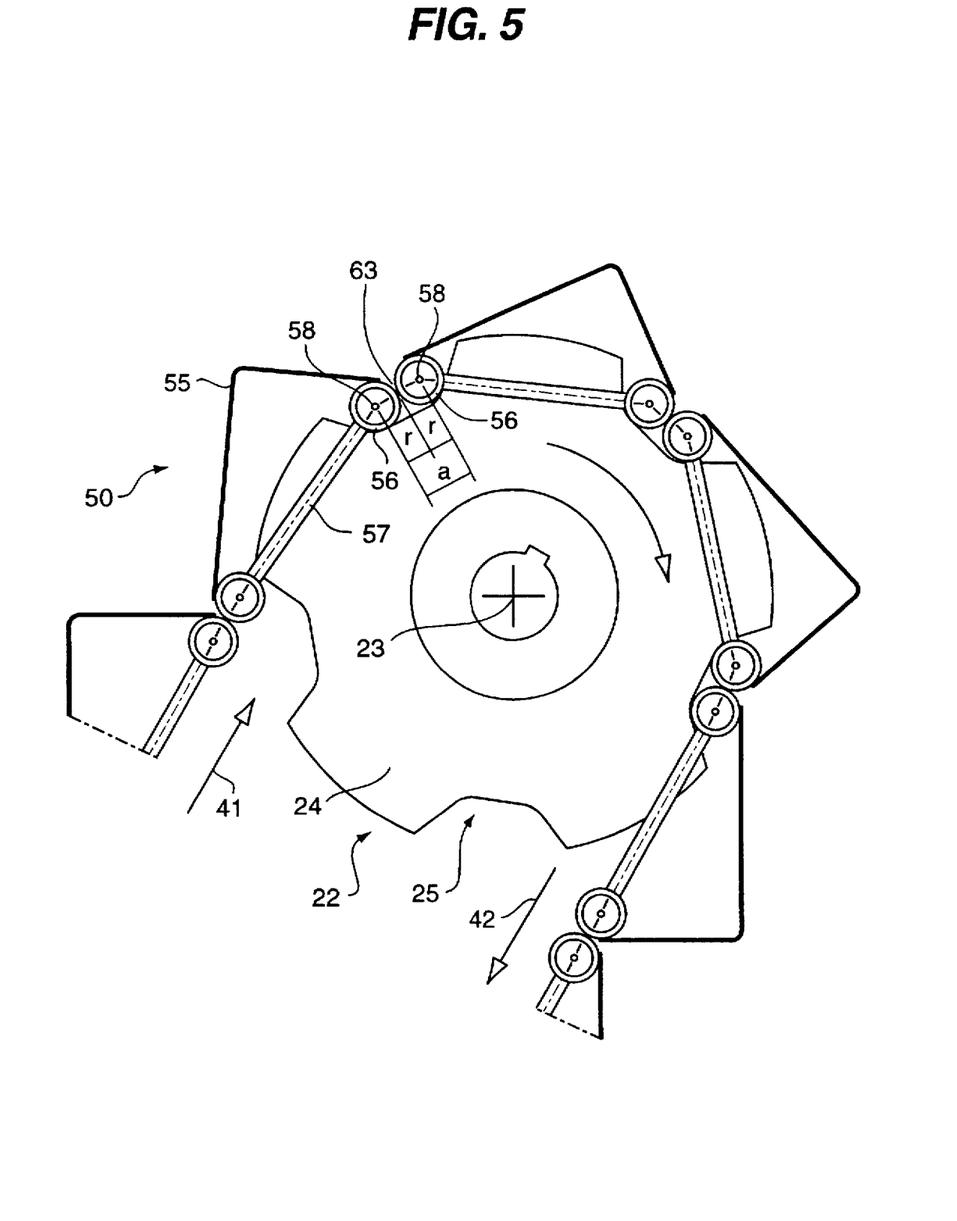
FIG. 5 is an enlarged view of a section from the uppermost portion of FIG. 1.

Reference is now made to FIG. 5 which is an enlarged illustration of the uppermost turning roller 22 comprising a sprocket 24 that rotates about the center line 23 and said sprocket being provided with notches 25 to allow the turning roller to engage with and guide the filter chain by spacer tubes 56 which engage with the notches 25, said tubes being integral with the individual strainer elements in a manner which will be explained below.

Figure 6:
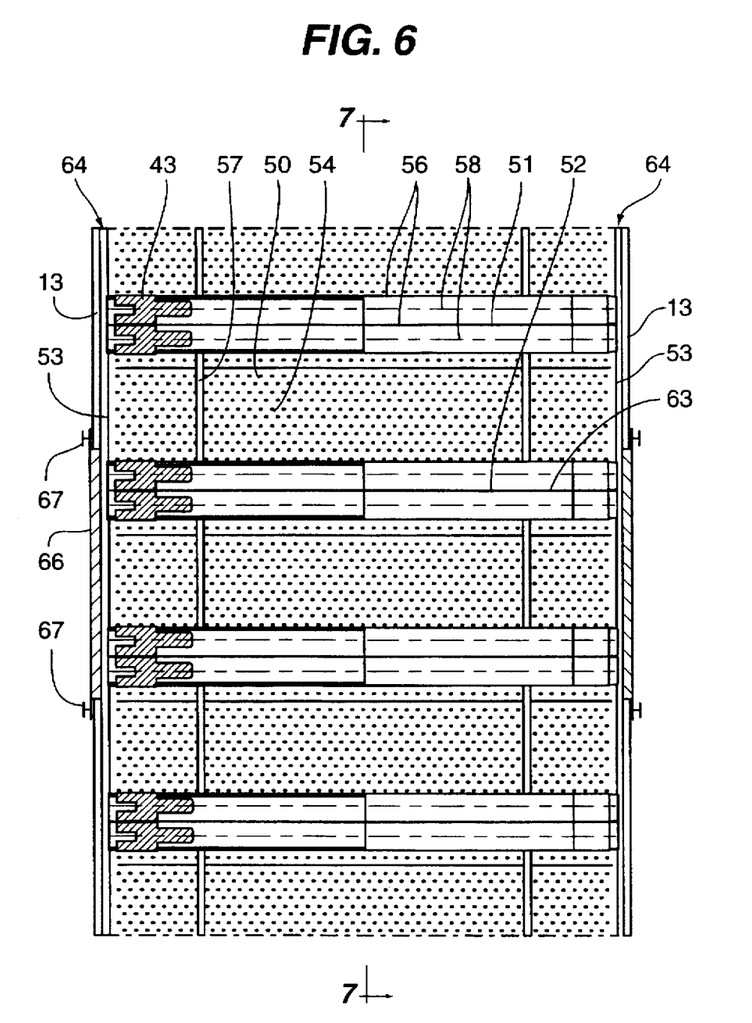
FIG. 6 is a planar view of a section of a filter chain according to an embodiment of the invention and seen from below.

Reference is now made to FIG. 6 which is a sectional view of the filter chain and the adjacent portions of the side profiles in an enlarged scale. The filter chain moves upwards in FIG. 6 and the side profiles extend parallel to the movement direction. The section shown in FIG. 6 illustrates a region around the inspection openings 65 and in the figure it is hinted how the inspection openings are closed with inspection covers 66 releasably secured to the side profiles 13 with assembling screws 67 or other suitable means in such a manner that continuous planes without protrusions are presented towards the filter chain and between which said filter chain may move.

Each strainer element 50 appears substantially rectangular in the illustration given in FIG. 6, delimited at the front as seen in the movement direction by a leading edge 51 and at the rear in the movement orientation by a trailing edge 52 which runs parallel with the leading edge and at the sides by lateral edges 53 which run parallel with the movement direction of the chain. The area between leading, trailing and lateral edges are designated herein as the strainer panel 54 of the strainer element. The leading edge on a strainer element abuts on the trailing edge of the immediately preceding strainer element leaving between them a very small longitudinal gap 63. The gaps between the lateral edges 53 of the strainer panel and the most proximate plane of the respective side profiles 13 are designated the lateral gaps 64.

Figure 7:
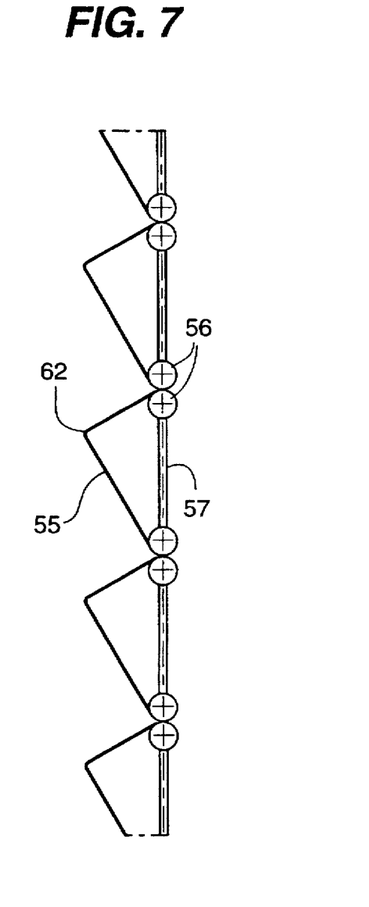
FIG. 7 is a sectional view along the line E—E indicated in FIG. 6.

From a construction point of view, the individual strainer element comprises two spacer tubes 56, viz. one which constitutes the leading edge and one which constitutes the trailing edge, said two spacer tubes being mutually connected by longitudinal struts 57 to form a substantially rigid framework of the shape shown in FIG. 6 combined with that of FIG. 7. The spacer tubes are depicted in sectional views in the left half of FIG. 6. The remaining portion of the strainer panel is covered by a strainer plate 55 which is in substantially sealing connection with the spacer tubes, e.g. by means of spot welding, and which are provided with perforations in the form of suitable apertures or gaps in an arrangement corresponding to the desired strainer performance. As will appear from the sectional view given in FIG. 7, the strainer plate 55 may be bent to form an angle with a protruding ridge 62 which runs parallel with the spacer tubes. By imparting to the strainer plate a non-planar design, the effective strainer area is increased and the shape shown provides a staircase effect which reduces the propensity of the filter cake to slide or roll down along the filter chain when the latter moves slantingly upwards.

The invention is not limited to the cross sectional shape of the strainer plate shown, but may just as well be used with other shapes, e.g. planar, arched or polygonal shapes. For instance, the strainer elements could be planar with protruding conveyor spikes to ensure the conveying effect. The filters may be realised in any manner known in the art to obtain different properties according to the intended use, and may e.g. be constructed to comprise several layers, if convenient.

Figure 8:
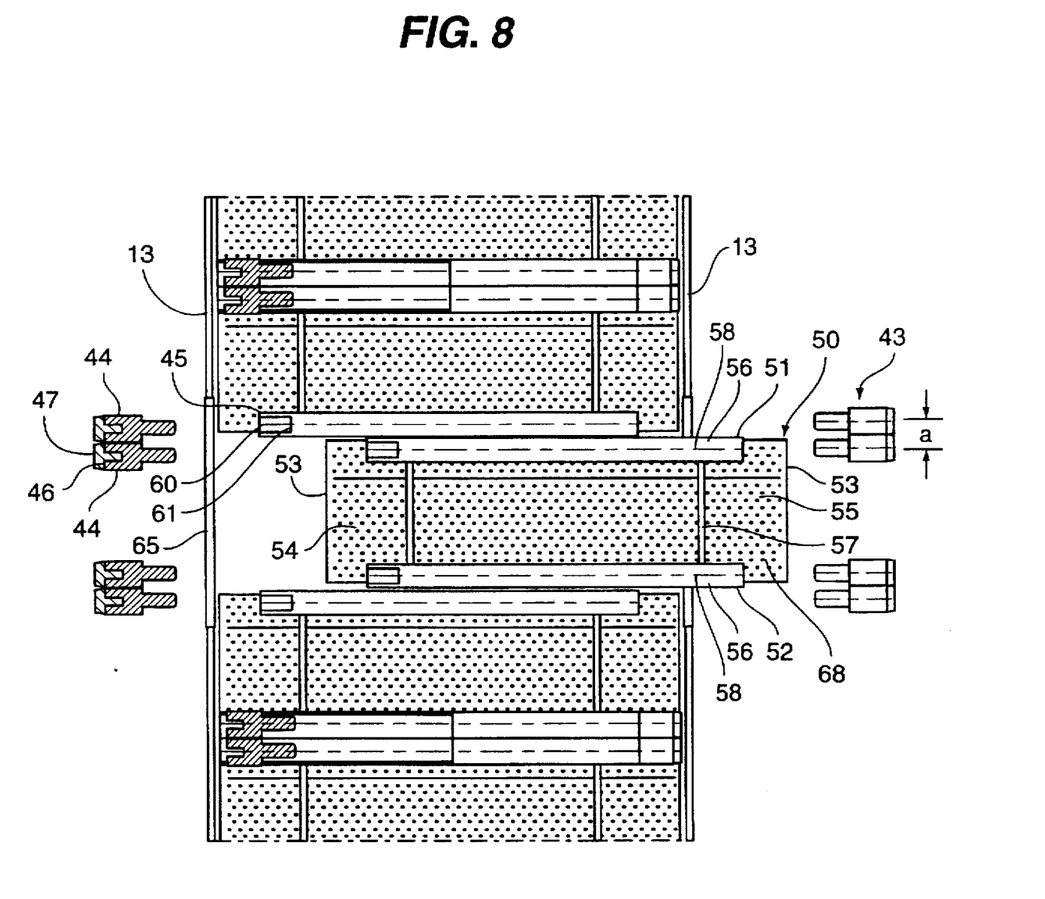
FIG. 8 is an illustration corresponding to FIG. 6 but depicting one strainer element partially pulled aside.

Reference is now made to FIG. 8 which is an illustration similar to that of FIG. 6 except that certain parts are shown in a pulled-apart state and that a strainer element 50 is shown partially pulled sideways as would be the case during dismantling. In FIG. 8 the inspection covers 66 (described in connection with FIG. 6) are removed which leaves the inspection openings 65 in both sides completely open. As described in connection with the connecting trunnions, which are shown in FIG. 8 in their pulled-apart state, it appears more clearly from FIG. 8, how the spacer tubes 56 which are depicted with parts cut away in the left half of FIG. 8, have such length that they terminate a certain distance within the lateral edges of the strainer elements.

The spacer tubes 56 are open cylindrical tubes which are, over a predetermined stretch from each end machined on their insides to widen the lumen to a slightly larger diameter 60, the widened section being terminated inwardly by an abutment 61 to allow a bearing bushing 45 to be pressed into the tube from the extremity. The bearing bushing is so sized that it may abut on the abutment 61 to determine its position. The bearing bushing is a smooth cylindrical bushing of a material which have suitable bearing properties in the environment where the filter chain is to operate. According to a preferred embodiment, nylon is used which has suitable properties for operation in an aqueous environment. The strainer plate 55, which is provided with a perforated plate 68 herein, is secured to the spacer tubes 56 by spot weldings and it will appear from FIG. 8 how the strainer plate protrudes slightly beyond the tube extremities, the strainer plate having such width that it may be allowed to pass between the side profiles 13 with a narrow free lateral gap 64 in both sides.

Moreover, FIG. 8 describes four connecting links pulled-apart with two to each side, the two to the left in the figure being depicted in sectional views. Each connecting link 43 comprises two rotationalsymmetrical trunnion bodies 44 with a narrowed trunnion portion which fits inside a bearing bushing 45 and a wider cylindrical portion with a diameter which corresponds to the outer diameter of (a) spacer tube 56. From the extreme end a countersunk bore 46 is provided wherein a slide stub 47 is inserted which is made of a material which has good bearing properties in the environment where the filter chain is to operate. According to the preferred embodiment, nylon is used which functions suitably in the presence of water.

Two trunnion bodies 44 of this type are arranged next to each other and mutually parallel with a well defined centerline spacing a and are welded together to form a connecting link 43. When a trunnion on a connecting link 43 is introduced into the bearing bushing 45 in a strainer element 50, the connecting link may rotate about the center line 58 of the spacer tube 56, and the strainer element may rotate about the center line of the respective trunnion body 44 of the connecting link. Here, the wider, cylindrical region of the trunnion body forms a substantially smooth continuation of the outer cylindrical surface of the spacer tube to the lateral edge of the strainer element. When two strainer elements 50 are connected by the introduction of a connecting link 43 from each side, a connection is obtained with freedom of pivoting about the two axes of the spacer tubes which are maintained at a permanent mutual distance. The connecting links 43 being constructed with a center line spacing (a) which exceeds the sum of the two radii to the respective outer cylinder surfaces of the respective spacer tubes, allows for a constant clearance between the spacer tubes of the respective connected strainer elements in all states of pivoting.

As previously mentioned, FIG. 5 illustrates how the chain is driven around the upper turning roller and it appears from the figure how the connecting links, which are not explicitly shown in FIG. 5 but sketched by the line between the center axes of the two trunnion bodies, pivot relative to the strainer elements. During this pivotation, narrow gaps are maintained between the spacer tubes of successively disposed strainer elements. It is important that the open gap between the strainer elements is suitably narrow and most importantly that it is constant during the full path travelled by the chain in order to prevent foreign bodies from entering and wedging themselves between the strainer elements.

Although in the preferred embodiment, the spacer tubes are identical with the radius (r) as shown in the figure, this is not an indespensable requirement; the principle of constant gap width may very well be realised with different radii of the spacer tubes, e.g. in a chain where all the tubes at the leading edges of the strainer elements have one size and all the tubes at the trailing edges another, provided that the center line spacing (a) defined by the connecting links corresponds to the sum of the radii of the two spacer tubes kept together by a connecting link plus the clearance which is desired maintained between the spacer tubes.

Although, in the preferred embodiment, the spacer tubes are circularly cylindrical around the entire circumference, the invention presupposes only that they are in fact cylindrical or approximately cylindrical around the angle sector of points which may happen to form the edge area, i.e. which may happen to be situated proximate the neighbouring elements during the travelling of the chain, while the sectors which at no time happen to be most proximate to a neighbouring element may have any shape. Thus, the angle sector which should conform to a sector of a cylinder depends on the operation conditions of the chain, viz. how intensive angulation the chain is exposed to while travelling its entire path. The angle sector of points which may occur to be located proximate the neighbouring elements is generally equal to the sector covered by the connecting link, generally ranging from a straight direction to an oblique direction where the chain rounds a turning roller.

It is considered most convenient if the spacer tubes have a smooth surface to reduce the risk that they press solid objects into the gap during their travel. Particularly smooth surfaces may be obtained by choice of suitable materials for the spacer tubes, through wrapping-in of the spacer tubes or by coating them with materials which distinguish themselves by particularly smooth surfaces.

It further appears from FIG. 8 how the slide studs 47 which are disposed in the countersunk bores 46 on the connecting links 43 protrude slightly beyond the lateral edges 53 of the strainer plates. Hereby it is ensured that the trunnion bodies 44 control the filter chain so that no points of the strainer plates 55 comes into contact with the side profiles 13. By suitable dimensioning of the strainer plates 55 and suitable arrangement of the side profiles 13, it is ensured that the lateral gaps 64 which are open to both sides of the filter chain are so narrow that it is impossible for any solid objects of a size larger than acceptable with a view to the filter performance to pass through the lateral gap. In the same way the longitudinal gaps between successively arranged strainer elements are adapted so as not to allow larger foreign bodies to pass therethrough than acceptable from a filter performance point of view.

Figures 9, 10:
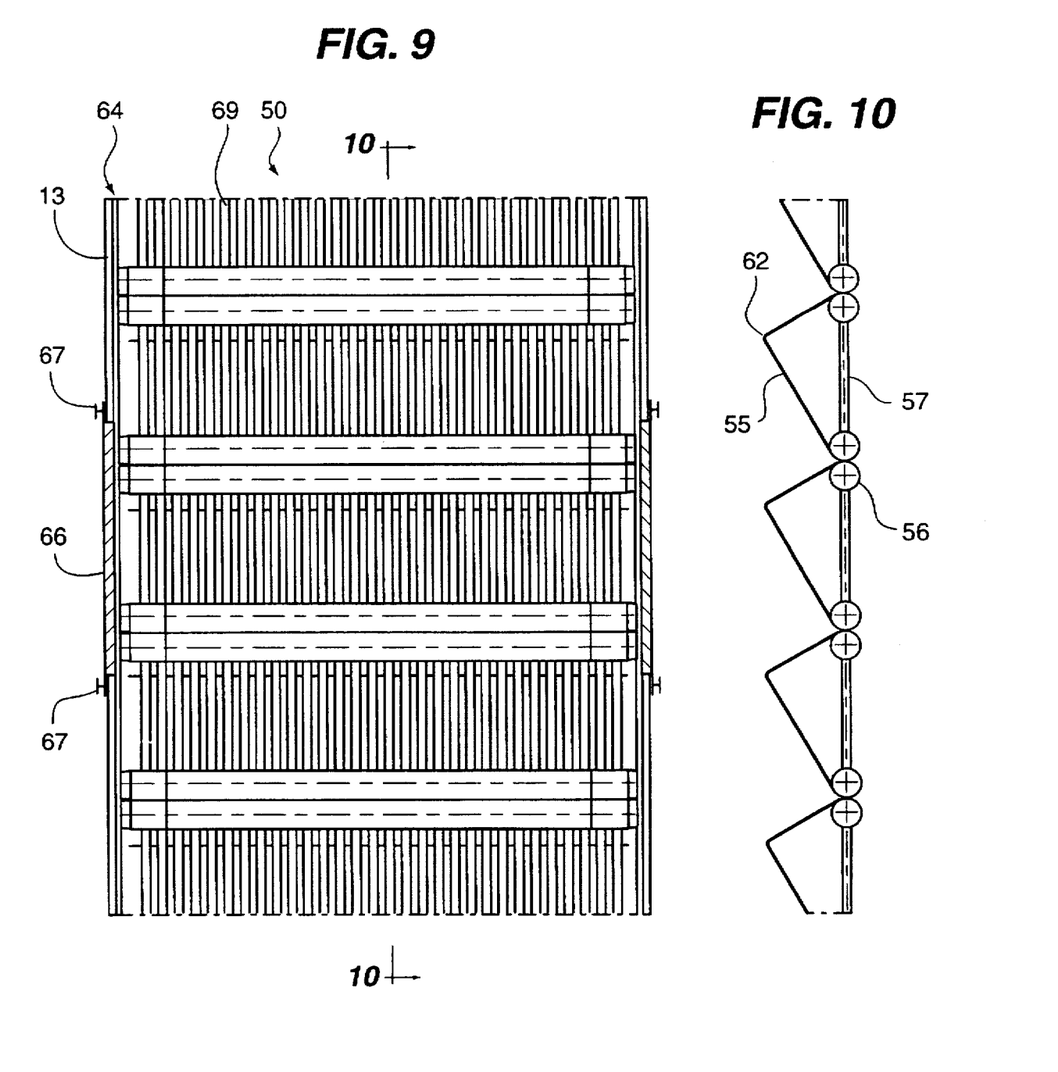
FIG. 9 is a planar view of a section of a filter chain according to another embodiment while, in other respects, the illustration corresponds to FIG. 6.
FIG. 10 is a sectional view along the line F—F in FIG. 9.
Figure 11:
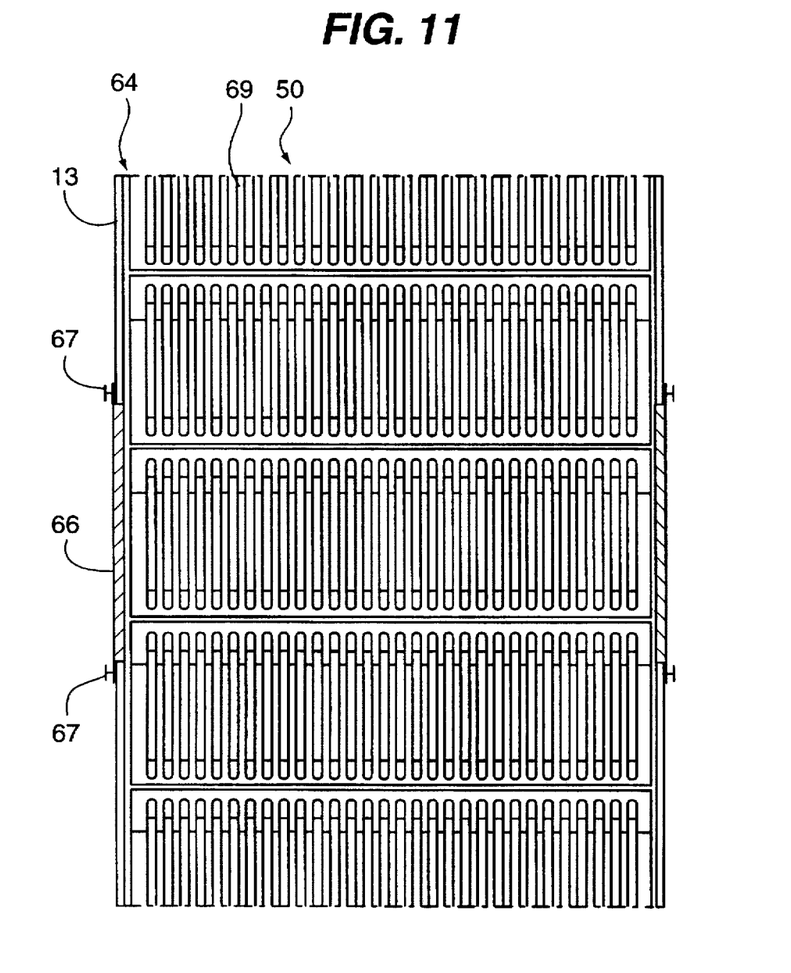
FIG. 11 shows the same section as FIG. 9 but seen from the front of the filter chain.

Reference is now made to FIGS. 9, 10 and 11 which illustrate an alternative embodiment of the filter chain according to the invention wherein the strainer elements comprise grate plates instead of perforated plates. The illustration according to FIG. 9 is similar to the one shown in FIG. 6, and that of FIG. 10 corresponds to the one in FIG. 7, while FIG. 11 shows a part of the filter chain with grate plates shown in FIG. 9 but in a view seen from the front of the filter. In the embodiment shown in FIGS. 9, 10 and 11 the strainer plates 55 are realised in the form of grate plates 69, i.e. each strainer panel 54 is covered by a grate plate 69 which is fastened to the respective spacer tubes at the leading edge and at the trailing edge by spot welding, and which has narrow parallel gaps in the conveyor direction of the chain, and which in transverse view extends with an angulation comprising a protruding ridge 62 like the preceding embodiment. Apart from this feature, this embodiment corresponds to the embodiments described in connection with FIGS. 6, 7 and 8 and consequently reference may be made to the above explanation.

Reference is once again made to FIG. 1 to explain that the lower turning roller of the preferred embodiment is constituted of a solid cylidrical body of a material which has good bearing properties in the relevant environment, e.g. nylon, and around which body the filter chain simply slides. In this manner a particularly simple and robust construction is realised which presents good operation properties in the given circumstances.

The filter according to the invention may be operated in several manners. It may be driven around continuously or periodically or it may be activated manually when deemed necessary and for as long as deemed necessary.

According to an advantageous embodiment, the control box is designed to continuously monitor the liquid levels on the upstream and the downstream side and to start the filter when the pressure difference exceeds a predetermined level. In this case the filter may be run a predetermined stretch, e.g. so as to cause all of the portion immersed into the liquid to be lifted above the liquid level, following which the filter rotation is discontinued. Alternatively, the filter is trained until the liquid sensors detect that the pressure difference has been reduced to a predetermined lower level. The control box is conveniently designed to also control the cleaning brush to make it rotate only while the filter chain is trained.

Although a specific embodiment of the invention has been described above, it serves only to exemplify and illustrate the invention and is not intended to limit the scope thereof, which is exclusively defined by the appended claims. Although various components have been described herein in a specific context, this does not preclude the individual components from being suitable in other combinations and possibly from being patentable themselves.

I claim:

1. An endless filter chain or the filtering of liquid with the object of removing solid objects from the liquid and comprising strainer elements and connecting links, wherein each strainer element extends in the conveyor direction of the chain and is delimited by two mutually parallel edges designated leading edge and trailing edge, respectively, and by two lateral edges extending perpendicularly to the leading edge and the trailing edge, wherein two successively arranged strainer elements are connected by means of one or more connecting links embedded substantially completely within the width of said strainer elements, each connecting link comprising pivot means having two parallel, spaced trunnions defining two parallel, spaced pivot axes which are perpendicular to the conveyor direction of the filter chain, whereby said connecting link may link together two successively arranged strainer elements with freedom for each strainer element to pivot relative to adjacent connecting links about a respective one of said pivot axes parallel with the leading edge and the trailing edge, the leading edge and the trailing edge on each strainer element comprising cylindrical tubes so that a small clearance with approximately unchanged width is maintained between the leading edge of a strainer element and the adjacent trailing edge on the immediately preceding strainer element.

2. The filter chain according to claim 1, wherein each strainer element comprises a grate or a perforated plate which covers an at least substantially coherent area from the leading edge to the trailing edge of the strainer element and which are delimited to the sides by lateral edges which extend substantially perpendicular to the leading edge and the trailing edge.

3. The filter chain according to claim 1, wherein pivots for the connecting links are disposed which are concentric with the respective tubes.

4. The filter chain according to claim 3, wherein the tubes comprise bearing bushings inserted at the extremities, said bearing bushings being made of a material suitable as bearing material in the environment where the filter chain is to be used, in particular in an aqueous environment.

5. The filter chain according to claim 3, wherein each connecting link comprises two uniform parallel and adjacently located trunnions adapted to be inserted axially into respective tubes from the tube extremities whereby two strainer elements are connected by the introduction of a connecting link from each side of the strainer elements.

6. The filter chain according to claim 3, wherein each of said cylindrical tubes is terminated a certain distance within the lateral edges of the strainer elements.

7. The filter chain according to claim 6, wherein the connecting links and the lateral edges are so adapted and mutually matched that the filter chain may run between fixed elongated lateral planes with clearances which are so small that the filter performance may be maintained without particular sealing means along the lateral edges.

8. The filter chain according to claim 7, wherein elements of a low-friction material are provided at the lateral edges of the strainer elements and/or at the connecting links, said elements being suitable for sliding against fixed lateral edges in such a manner that the filter chain is allowed to be guided with a small lateral clearance.

9. The filter chain according to claim 8, wherein the connecting links are provided with replaceable, sideways elements of a low-friction material.

10. The filter chain according to claim 9, wherein the connecting links are maintained in engagement with the strainer elements by the chain being guided between fixed lateral surfaces which do not leave sufficient room for the connecting elements to escape sideways.

11. The filter chain according to claim 2, wherein the perforated plate or the grate is so designed that it extends rectilinearly, arched, angularly or polygonally and optionally comprises conveyor protrusions shaped in such a manner that the filter chain may convey the filtered-out solid material when conveyed in an upwardly slanting path.

12. The filter chain according to claim 1 wherein said trunnions are inserted axially inside bearing bushings and axially extending elements of a low-friction material.

13. An endless filter chain according to claim 1 combined with and mounted in an apparatus for filtering liquid, flowing in a duct, comprising: guide means which guide the filter chain in a closed path which extends partially above and partially below the surface level of said liquid; and driving means to move the filter chain along said path and lateral profiles in the form of fixed lateral surfaces in the duct which form a substantially unbroken slide surface in each side to support the driving chain laterally with a narrow clearance.

14. The apparatus according to claim 13, wherein the guide means comprises means to guide the filter chain through a lower turning zone below the liquid surface level, through a substantially rectilinear ascending flight, through an upper turning zone above the liquid surface level and through a substantially rectilinear descending flight back to the lower turning zone.

15. The apparatus according to claim 14, wherein the driving means comprises a motor-operated roll which constitutes the means to guide the chain through the upper turning zone, and that the guide means on the remainder of the path is constituted exclusively of fixed elements of a low-friction material on which the filter chain may slide.

16. The apparatus according to claim 13, further comprising sealing means to prevent or stall the water flow below the chain in the region at the lower turning zone, which sealing means in combination with the fixed lateral surfaces form a coherent sealing to the duct on the upstream side so that the water to be filtered is substantially forced through the strainer elements in the filter chain.

17. The apparatus according to claim 14, wherein the lateral profiles in the duct comprise discharge apertures which establish communication allowing liquid to flow from the zone between the ascending and the descending filter chain flights and outwards to the duct on the downstream side relative to the filter.

18. The apparatus according to claim 13 further comprising means arranged at the filter chain above the level of the liquid surface to remove solid material from the filter chain and means to collect cleaned-off solid material.

19. The apparatus according to claim 13, wherein the fixed lateral surfaces comprise removable panels adapted to allow dismantling of connecting links and strainer elements through the side following opening of such panels.

20. A method of filtering a liquid which flows along a duct, comprising the steps of selecting an endless filter chain, said chain comprising strainer elements and connecting links, each of said strainer elements extending in the conveyor direction of the chain and being delimited by two mutually parallel edges, designated leading edge and trailing edge, respectively, and by two lateral edges extending perpendicularly to the leading edge and the trailing edge, wherein two successively arranged strainer elements are connected by one or more connecting links embedded substantially completely within the width of said strainer elements, each connecting link comprising pivot means having two parallel, spaced trunnions defining two parallel, spaced pivot axes, by which adjacent strainer elements may pivot relative to adjacent connecting links about pivot axes parallel with the respective leading edge and trailing edge, the leading edge and the trailing edge on each strainer element comprising cylindrical tubes so that a small clearance with approximately unchanged width is maintained between the leading edge of the strainer element and the adjacent trailing edge on the immediately preceding strainer element, whether the filter chain is trained about turning rollers or runs straight, guiding said filter chain in a closed path, extending through a lower turning zone below the surface level of the liquid, through a substantially rectilinear ascending flight, through an upper turning zone above the surface level of the liquid and through a substantially rectilinear descending flight back to the lower turning zone, guiding said chain laterally with a narrow clearance by providing lateral profiles in the form of fixed lateral surfaces in the duct which form a substantially unbroken slide surface in each side, feeding unfiltered water to said filter chain at the front side of said ascending flight, removing filtrate from the opposite side of said flight, training said filter chain along said path to transport filtered-off material out of the water, and removing the filtered-off material to deposit it in a receptacle.

21. The method according to claim 20, wherein the pressure difference across the filter chain is continuously monitored and the filter chain is trained for as long as the pressure difference exceeds a predetermined level.

22. The method according to claim 21, wherein the removing of the solid material from the filter chain is performed only for the duration of the filter chain motion.

* * * * *